United States Patent
Geibel, Jr.

(10) Patent No.: US 8,920,155 B2
(45) Date of Patent: Dec. 30, 2014

(54) LOCKING APPARATUS FOR COMMON PLATE STEM ACTUATOR

(71) Applicant: Caco Pacific Corporation, Covina, CA (US)

(72) Inventor: Martel B. Geibel, Jr., Pomona, CA (US)

(73) Assignee: Caco Pacific Corporation, Covina, CA (US)

( * ) Notice: Subject to any disclaimer, the term of this patent is extended or adjusted under 35 U.S.C. 154(b) by 99 days.

(21) Appl. No.: 13/838,737

(22) Filed: Mar. 15, 2013

(65) Prior Publication Data

US 2014/0271977 A1   Sep. 18, 2014

(51) Int. Cl.
   *B29C 45/00*   (2006.01)
   *B29C 45/20*   (2006.01)

(52) U.S. Cl.
   CPC ..................... *B29C 45/20* (2013.01)
   USPC ........... 425/564; 425/562; 425/565; 425/566; 425/192 R; 425/190

(58) Field of Classification Search
   CPC ............ B29C 45/2803; B29C 45/2806; B29C 45/281; B29C 45/176
   USPC .................. 425/562, 564, 565, 566, 182, 595
   See application file for complete search history.

(56) References Cited

U.S. PATENT DOCUMENTS 8,282,870 B2 * 10/2012 Bouti et al. ............... 264/328.8
2003/0151165 A1 * 8/2003 Colonico .................. 264/328.1

OTHER PUBLICATIONS

Mag Pin description in E-Drive Feature Sheet (version 2012) on www.moldmaster.com. <http://www.moldmasters.com/media/documents/e-Drive_FS_ENG.pdf>. Publication date unknown.
"Tech Mold develops in-mold serviceability to improve production efficiencies." Plastics Today Web. <www.plasticstoday.com>. Published Jan. 28, 2013.

\* cited by examiner

*Primary Examiner* — Timothy Kennedy
*Assistant Examiner* — David N Brown, II
(74) *Attorney, Agent, or Firm* — Leech Tishman Fuscaldo & Lampl LLP; Denton L. Anderson

(57) ABSTRACT

A locking apparatus for a machine having multiple stems which axially reciprocate with respect to a stationary unit by linkage with a reciprocating common plate. The locking apparatus includes: (a) a first locking assembly capable of alternatively locking and unlocking one of the stems to the common plate; and (b) a second locking assembly capable of alternatively locking and unlocking one of the stems to the stationary unit. The second locking mechanism is configured so that, when the first locking assembly locks a stem to the common plate, the second locking mechanism automatically unlocks that stem from the stationary unit, and when the first locking assembly is unlocked from the common plate, the second locking mechanism automatically locks that stem to the stationary unit.

17 Claims, 7 Drawing Sheets

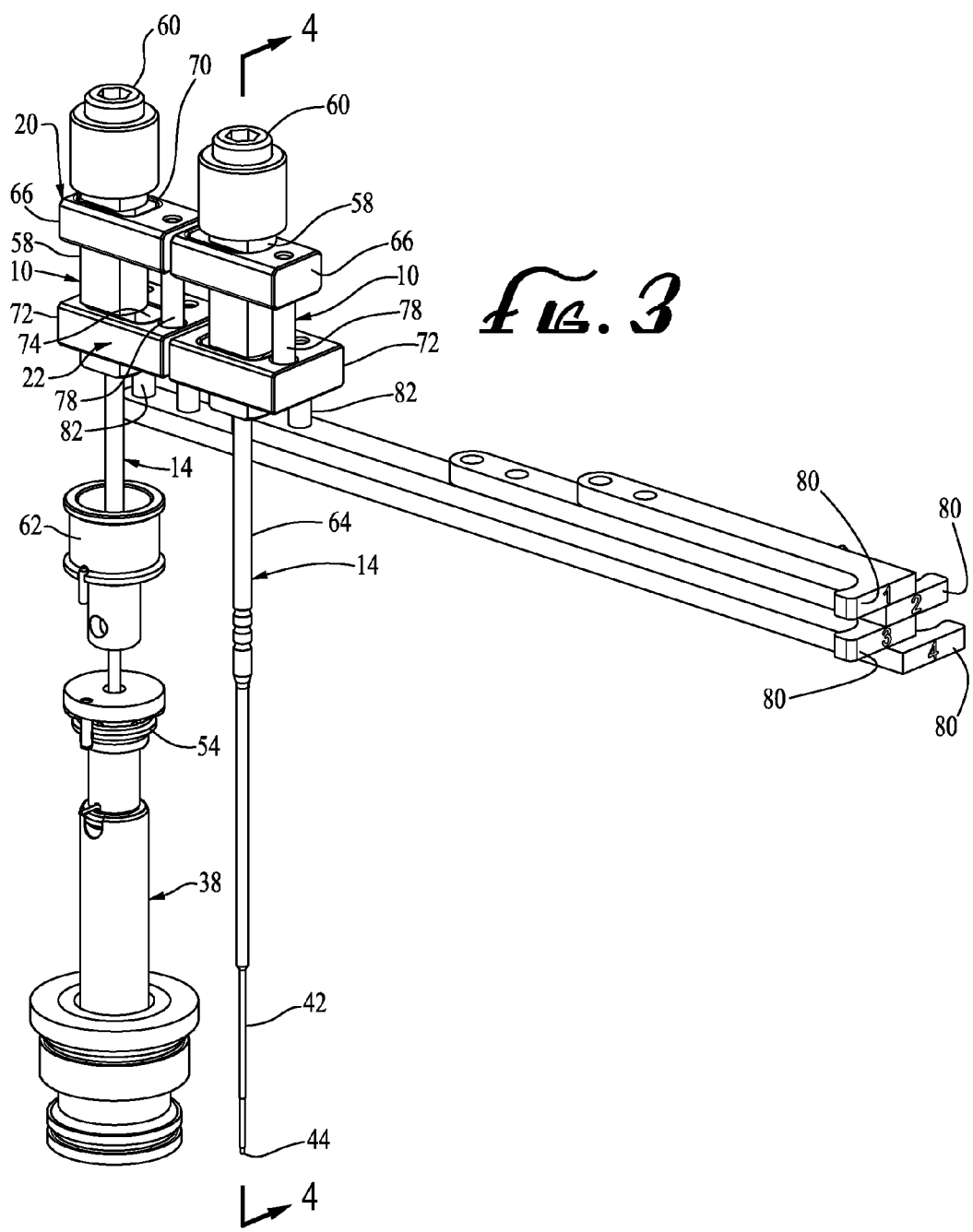

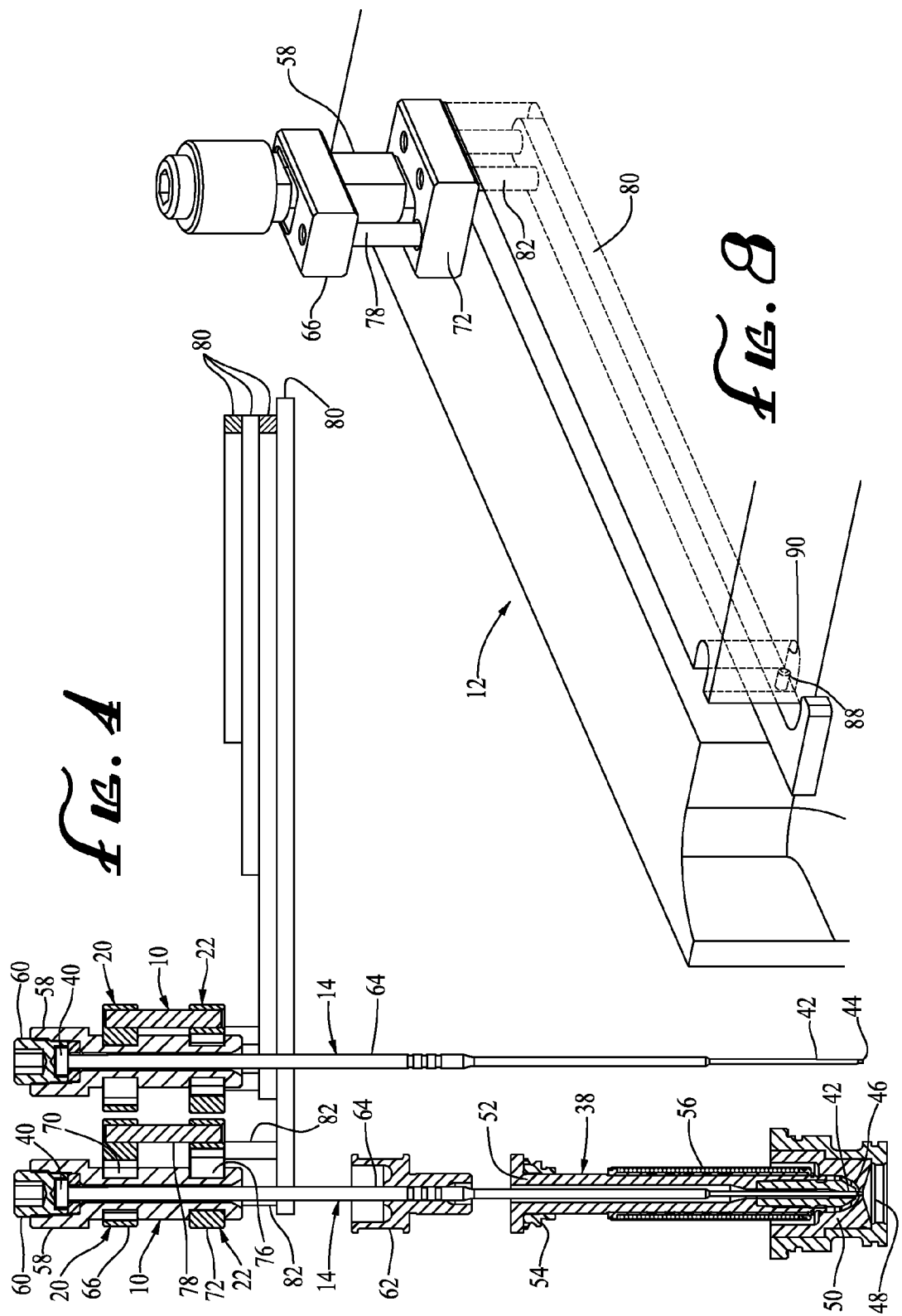

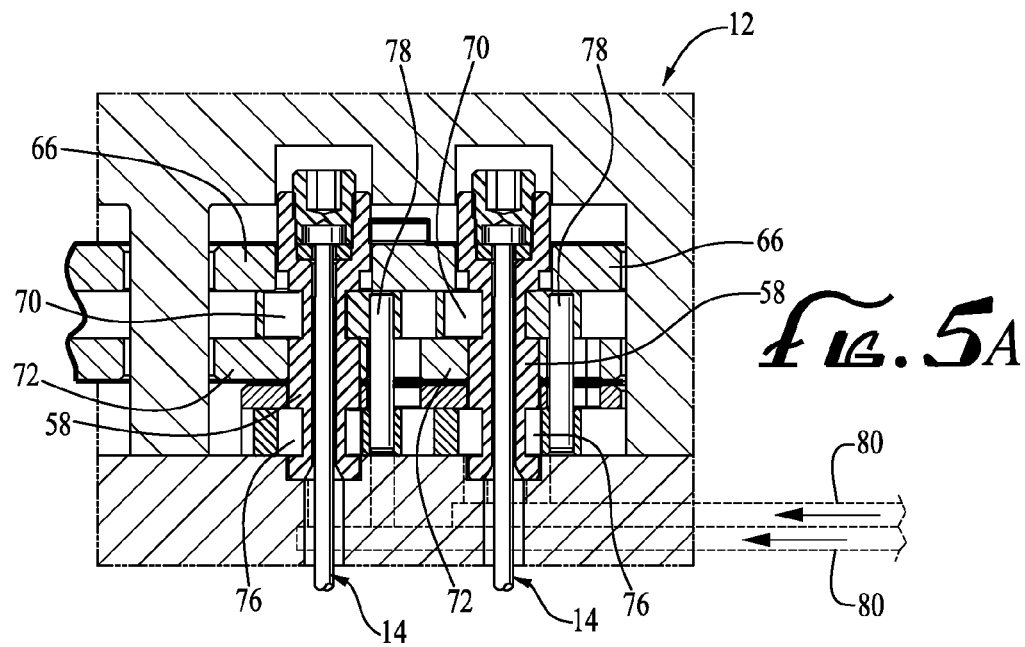
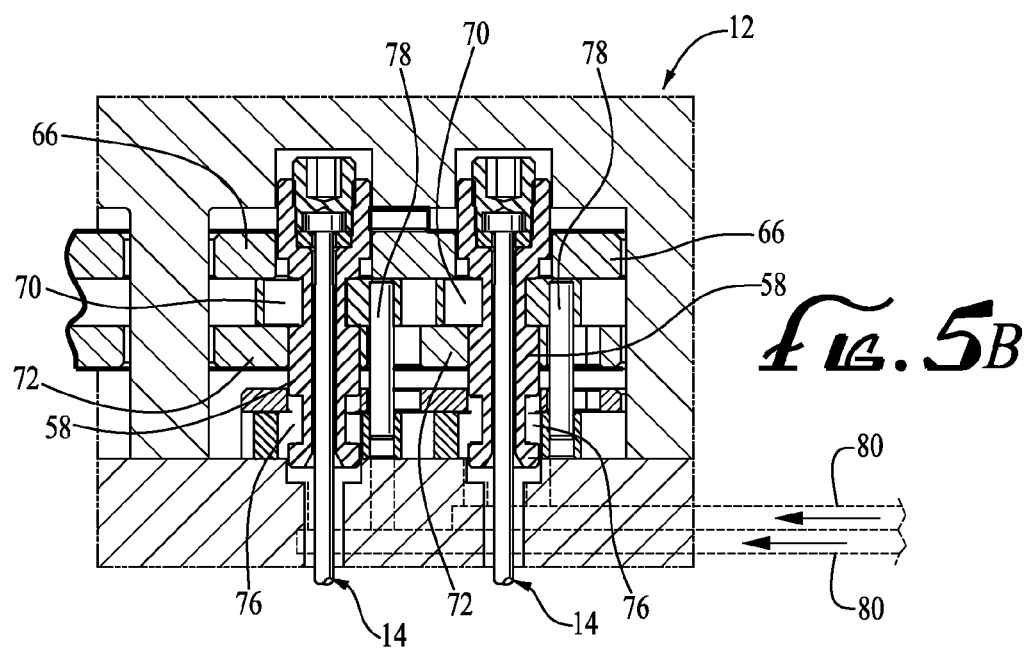

LOCKING APPARATUS FOR COMMON PLATE STEM ACTUATOR

FIELD OF THE INVENTION

The invention relates generally to machinery having a plurality of axially reciprocating stems, and, more specifically, to injection mold apparatuses employing a plurality of axially reciprocating stems in a hot runner system.

BACKGROUND OF THE INVENTION

A hot runner system is a frequently employed assembly of heated components used in plastic injection molds to inject molten plastic into the cavities of a mold. The heated components comprise a plurality of heated injection tubes, each of which carries molten plastic to a cavity within the mold. In all hot runner systems a gating mechanism is required to open and close nozzles at the end of each injection tube. Most gating mechanisms employ a valve at the end of each injection nozzle. Each valve has a valve plug which is disposed at the end of a valve stem. Each valve stem is axially disposed within each injection tube. Each valve stem can axially travel back and forth within its injection tube to alternatively position its valve plug between (i) an open position, wherein the valve plug seals the opening at the end of an injection nozzle, and (ii) a closed position, wherein the valve plug is disposed away from the opening at the end of the injection tube.

One common gating mechanism is termed a "valve gate" mechanism. In a valve gate mechanism a pneumatic piston or similar driver is used to actuate each individual valve stem. Another common gating mechanism is termed a "common plate" mechanism (sometimes referred to as a "synchroplate" mechanism). In common plate mechanisms a single (common) plate simultaneously actuates the valve stems for all of the injection tubes. The common plate is reciprocated in attachment with all valve stems to simultaneously drive them back and forth within their injection tubes. The reciprocation of the common plate is driven by one or more pneumatic pistons, hydraulic pistons or servo motors.

It is considered highly desirable to provide all gating mechanism with a mechanical shut off feature to allow the operator to shut off individual injection nozzles while continuing molding with the other nozzles. Providing a valve gate mechanism with a mechanical shut off feature is simply and easily accomplish by the use of sliding plates, each of which can be slid behind one of the hydraulic pistons used to drive a valve stem. Each sliding plate is situated such that it can be slid to a position where it blocks the travel of its hydraulic piston when the valve plug is in its closed position.

It is much more difficult with common plate actuators to provide a mechanical shut off feature, since the common plate reciprocates all of the valve stems. Accordingly, there is a need for an actuation apparatus in a common plate hot runner system which the operator can easily and conveniently shut down one of the injection tubes without affecting the operation of the remaining injection tubes.

SUMMARY OF THE INVENTION

The invention satisfies this need. The invention is a locking apparatus for a machine having multiple stems which axially reciprocate with respect to a stationary unit, the stems being caused to axially reciprocate in unison by linkage with a reciprocating common plate, the locking apparatus comprising:

(a) a first locking assembly capable of alternatively assuming (i) a first locking assembly engaged position wherein at least one of the reciprocating stems is affixed to the common plate, and (ii) a first locking assembly non-engaged position wherein the at least one reciprocating stem is not affixed to the common plate; and (b) a second locking assembly capable of alternatively assuming (i) a second locking assembly engaged position wherein the at least one reciprocating stem is affixed to the stationary unit, and (ii) a second locking assembly non-engaged position wherein the at least one reciprocating stem is not affixed to the stationary unit. In the invention, the first locking assembly, the second locking assembly and the at least one reciprocating stem are configured so that, when the first locking assembly is placed in the first locking assembly engaged position, the second locking assembly is automatically placed in the second locking assembly non-engaged position and, when the first locking assembly is placed in the first locking assembly non-engaged position, the second locking assembly is automatically placed in the second locking assembly engaged position.

The invention can be employed in a wide variety of machinery having a plurality of axially reciprocating stems. The invention is particularly advantageous in injection mold apparatuses employing a plurality of axially reciprocating stems in a hot runner system.

DRAWINGS

These and other features, aspects and advantages of the present invention will become better understood with reference to the following description, appended claims and accompanying drawings where:

FIG. 3 is a perspective view of the locking apparatus illustrated in FIG. 2;

FIG. 4 is a cross-sectional side view of the locking apparatus illustrated in FIG. 3;

FIG. 5A is a first cross-sectional view of a portion of a locking apparatus having features of the invention, showing two valve stems in reciprocating mode;

FIG. 5B is a second cross-sectional view of a portion of the locking apparatus illustrated in FIG. 5A, showing both reciprocating valve stems in operational mode;

FIG. 8 is a perspective view of a portion of the locking mechanism illustrated in FIG. 1.

DETAILED DESCRIPTION OF THE INVENTION

Figure 1:
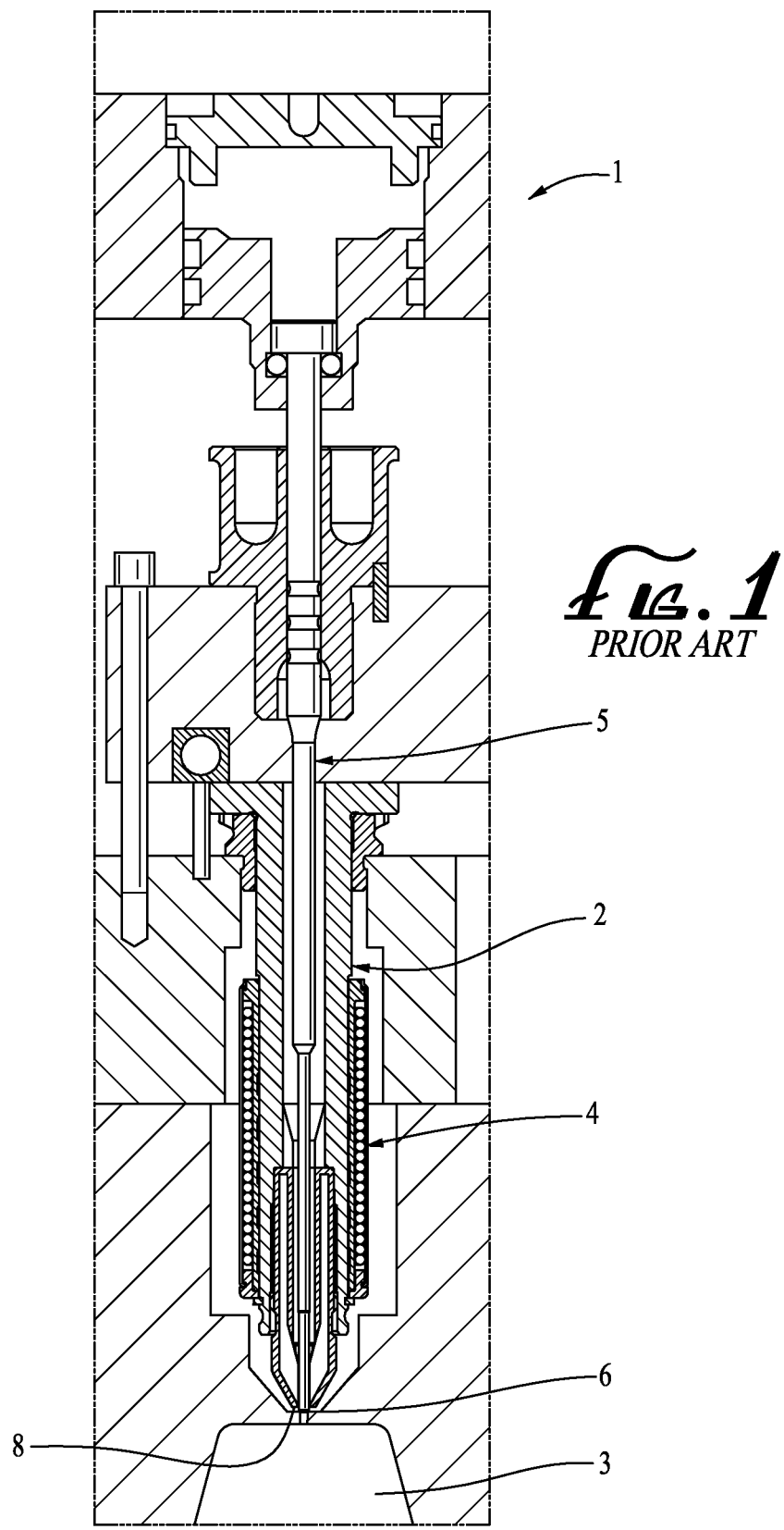
FIG. 1 is a cross-sectional side view of a mold employing a hot runner injection system of the prior art.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is a locking apparatus 10 for use in a machine 12 having multiple stems 14 which axially reciprocate with respect to a stationary unit 16, wherein the stems 14 are caused to axially reciprocate in unison by linkage with a reciprocating common plate 18. The locking apparatus 10 comprises a first locking assembly 20 and a second locking assembly 22. The locking assemblies 20 and 22 are linked such that, when the first locking assembly 20 is disposed in a locked position, the second locking assembly 22 is automatically disposed in an unlocked position and when the first locking assembly 20 is automatically disposed in an unlocked position the second locking assembly 22 is disposed in a locked position.

The locking apparatus of the invention 10 can be employed in a wide variety of machines 12 having a plurality of axially reciprocating stems 14. The invention is particularly advantageously employed in an injection mold apparatus 12 employing a plurality of axially reciprocating valve stems 14 in a hot runner system. The following detailed description of the locking apparatus 10 illustrates the use of the locking apparatus 10 in such an injection mold apparatus 12.

By way of background, FIG. 1 illustrates a typical injection mold apparatus 1 of the prior art employing a hot runner system. The hot runner system comprises a plurality of injection tubes, each of which carries molten plastic to a cavity 3 within the mold. Each injection tube 2 is heated by a coil heater 4 wrapped around the exterior of the injection tube 2.

Disposed axially within each injection tube 2 is a valve stem 5 having a valve plug 6 disposed at its distal end. The valve plug 6 is sized and dimensioned to plug the injection nozzle 8 at the distal end of the injection tube 2, thereby closing the injection tube 2 to the flow of molten plastic. The valve stem 5 is slidably disposed within the injection tube 2 such that it can be reciprocated up and down between (i) an open position wherein the valve plug 6 is retracted above the distal end of the injection nozzle 8 and a closed position wherein the valve plug 6 seals the distal end of the injection nozzle 8.

The reciprocation of the valve stem 5 can be accomplished by a pneumatic piston or similar driver attached to the valve stem 5. This form of actuation is termed "valve gate" actuation. Alternatively, each of the valve stems 5 can be simultaneously reciprocated by attachment to a common plate. The common plate is reciprocated up and down when driven by one or more pneumatic pistons, hydraulic pistons or servo motors. This form of actuation is termed "common plate" actuation.

Figure 2:
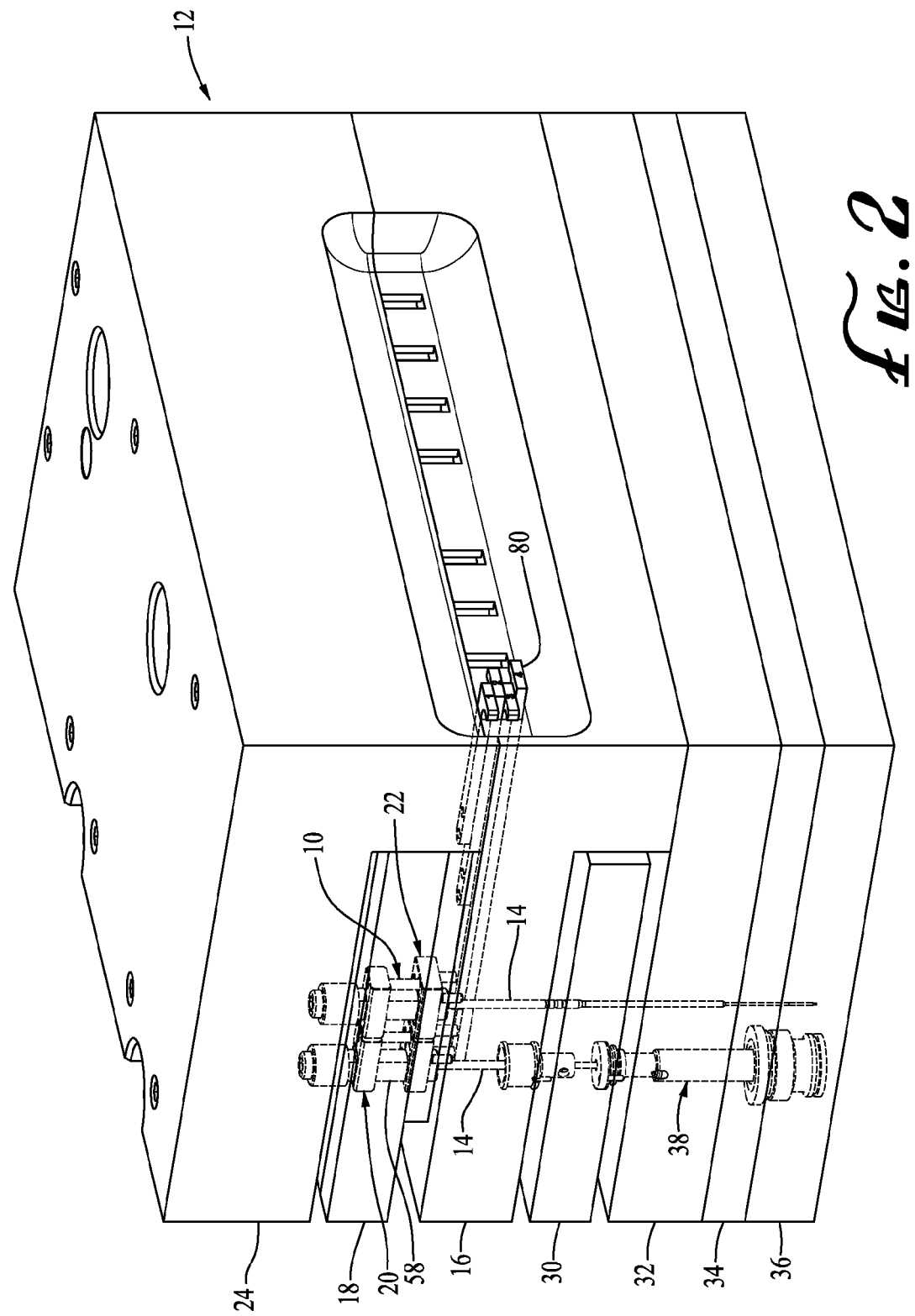
FIG. 2 is a perspective view of a mold employing a hot runner injection system and comprising a locking apparatus having features of the invention.

FIG. 2 illustrates a mold apparatus 12 having features of the invention. The mold 12 has a hot runner system with common plate actuation. The mold 12 comprises a hot half clamp plate 24, the common plate 18, a first manifold plate 28, a manifold 30, a second manifold plate 32, a cavity retainer plate 34 and a cavity plate 36.

Disposed within the mold is a plurality of injection tubes 38. Slidably disposed within each injection tube 38 is a valve stem 14 having a proximal end 40 and a distal end 42. The distal end 42 comprises a valve plug 44. In the mold illustrated in FIG. 2, a single injection tube 38 is illustrated. A second parallel valve stem 14 is also illustrated. The injection tube 38 and the second valve stem 14 shown disposed within the mold in FIG. 2 are shown in perspective in FIG. 3 and in cross-sectioned in FIG. 4.

As seen in FIG. 4, the injection tube 38 is affixed within the mold 12 at its distal end 46 by a cavity 48 and gate insert 50. The injection tube 38 is affixed within the mold 12 at its proximal end 52 by a locating collar 54. Disposed around the injection tube 38 is a coiled nozzle heater 56. The proximal end 40 of the valve stem 14 is slidably retained within the mold 12 by a valve stem housing 58 which is capped by a set screw 60. The valve stem 14 is slidably disposed within a valve bushing 62 at its central section 64 and within the injection tube 38 at its distal end 42. The distal-most end of the valve stem 14 comprises a valve plug 44, which its sized and dimensioned to seal the injection nozzle 38 at the distal end 42 of the injection tube 38. Each valve stem 14 is operably connected to the locking apparatus 10 as detailed below.

The valve stem is alternatively attached to and detached from the common plate 18 by the first locking assembly 20. The first locking assembly 20 is capable of alternatively assuming (i) a first locking assembly engaged position wherein at least one of the valve stems 14 is affixed to the common plate 18 and (ii) a first locking assembly non-engaged position wherein the at least one valve stem 14 is not affixed to the common plate 18.

In the embodiment illustrated in the drawings, the first locking assembly 20 is provided by a common plate slide lock 66. The common plate slide lock 66 is slidably attached to the common plate 18 such that, when the common plate 18 is reciprocated, the common plate slide lock 66 is likewise reciprocated.

The common plate slide lock 66 defines an elongate central opening 68 through which the valve stem housing 58 is disposed. The central opening 68 of the common plate slide lock 66 is sized and dimensioned to freely allow the valve stem housing 58 to pass through the center of the central opening 68, but to retain the common plate slide lock 66 when the common plate slide lock 66 is slid in abutment with either side of the valve stem housing 58 and into a first pair of opposed notches 10 defined on opposite sides of the exterior of the valve stem housing 58. Thus, when the common plate slide lock 66 is slid into abutment with the valve stem housing 58, the common plate slide lock 66 retains the valve stem housing 58. Alternatively, when the common plate slide lock 66 is slid to where the valve stem housing 58 is disposed down the center of the central opening 68 in the common plate slide lock 66, the valve stem housing 58 is not retained by the common plate slide lock 66.

The valve stem 14 is alternatively attached to and detached from a stationary unit 16 by a second locking assembly 22. In the embodiment illustrated in the drawings, the stationary unit 16 is provided by the first manifold plate 28. The second locking assembly 22 is capable of alternatively assuming (i) a second locking assembly engaged position wherein the at least one valve stem 14 is affixed to the stationary unit 16, and (ii) a second locking assembly non-engaged position wherein the at least one valve stem 14 is not affixed to the stationary unit 16.

In the embodiment illustrated in the drawings, the second locking assembly 22 is provided by a stationary unit slide lock 72. The stationary unit slide lock 72 is slidably attached to the first manifold plate 28.

Like the common plate slide lock 66, the stationary unit slide lock 72 defines an elongate central opening 74 through which the valve stem housing 58 is disposed. The central opening 74 of the stationary unit slide lock 72 is sized and dimensioned to freely allow the valve stem housing 58 to pass through the center of the central opening 74, but to retain the stationary unit slide lock 72 when the stationary unit slide lock 72 is slid in abutment with either side of the valve stem housing 58 and into a second pair of opposed notches 76 defined on opposite sides of the exterior of the valve stem housing 58. Thus, when the stationary unit slide lock 72 is slid into abutment with the valve stem housing 58, the stationary unit slide lock 72 retains the valve stem housing 58. Alternatively, when the stationary unit slide lock 72 is slid to where the valve stem housing 58 is disposed down the center of the central opening 74 in the stationary slide lock 72, the valve stem housing 58 is not retained by the stationary unit slide lock 72.

In the embodiment illustrated in the drawings, both the first pair of opposed notches 70 and the second pair of opposed notches 76 are provided by a single radial notch defined around the exterior of the valve stem housing 58.

In each of the injection tubes 38, the first locking assembly 20, the second locking assembly 22 and the reciprocating valve stem 14 are configured so that, when the first locking assembly 20 is placed in the first locking assembly engaged position, the second locking assembly 22 is automatically placed in the second locking assembly non-engaged position and, when the first locking assembly 20 is placed in the first locking assembly non-engaged position, the second locking assembly 22 is automatically placed in the second locking assembly engaged position. In the embodiment illustrated in the drawings, this is accomplished by the common plate slide lock 66 being mechanically linked to the stationary unit slide lock 72 by a dowel 78. Those of ordinary skill in the art will appreciate that other methods of linking the first locking assembly 20 to the second locking assembly 22, both mechanical and non-mechanical, can be employed in the alternative.

The linking of the first locking assembly 20 to the second locking assembly 22 is a critical feature of the invention. Without this feature, an operator could place the second locking assembly 22 into the engaged position while inadvertently forgetting to place the first locking assembly 20 into the non-engaged position, thereby causing considerable damage to the machine 12.

In the embodiment illustrated in the drawings, the common plate slide lock 66 and the stationary unit slide lock 72 are placed in the proper position by a sliding lever 80. As can be seen in the drawings, one sliding lever 80 is attached to the common plate slide lock 66 and the stationary unit slide lock 72 for each injection tube. In FIGS. 3 and 4, the lower-most sliding lever 80 operates the common plate slide lock 66 and the stationary unit slide lock 72 for the injection tube 38 to the left side of the drawing. In FIGS. 3 and 4, the second lowest sliding lever 80 operates the common plate slide lock 66 and the stationary unit slide lock 72 for the injection tube 38 to the right on the drawing. Two other sliding levers 80 are shown in FIGS. 3 and 4, but the common plate slide locks 66 and stationary unit slide locks 72 attached to these other sliding levers 80 are not shown.

In the embodiment illustrated in the drawings, each sliding lever 80 is attached to a stationary unit slide lock 72 by a pair of dowels 82.

FIGS. 5A and 5B illustrate the first and second locking assemblies 20 and 22 for two different injection tubes 38. In each injection tube 38, the first locking assembly 20 has been placed into the engaged position and the stationary unit locking assembly has been placed into the non-engaged position. Thus, both valve stems 14 are allowed to reciprocate with the reciprocation of the common plate 18, first downwardly (FIG. 5A) and then upwardly (FIG. 5B).

Figure 6A:
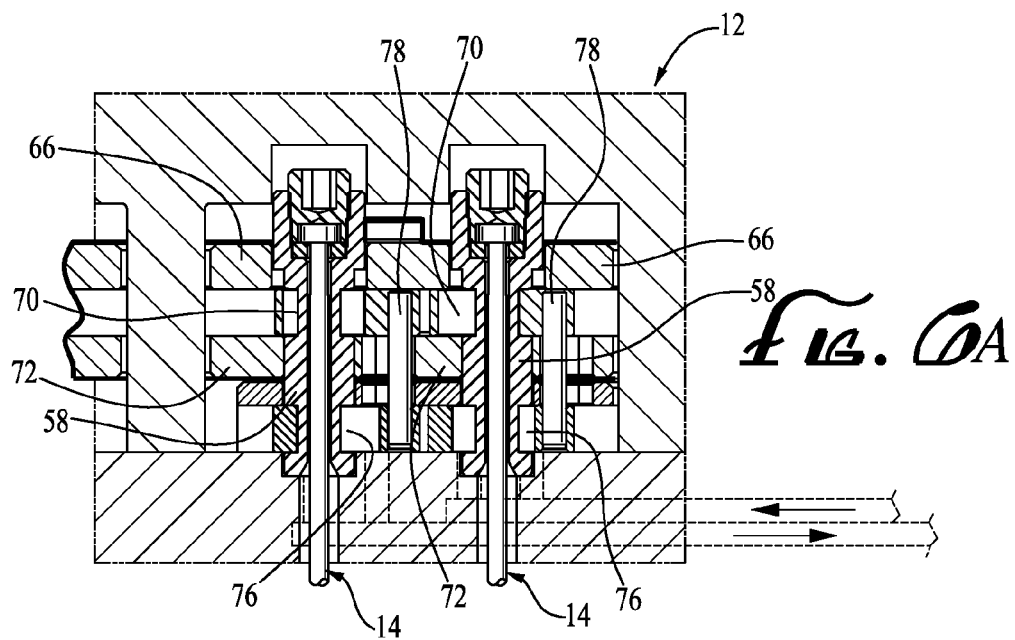
FIG. 6A is a first cross-sectional view of a portion of the locking apparatus illustrated in FIG. 5A, showing one of the valve stems in reciprocating mode and the other in non-reciprocating mode.
Figure 6B:
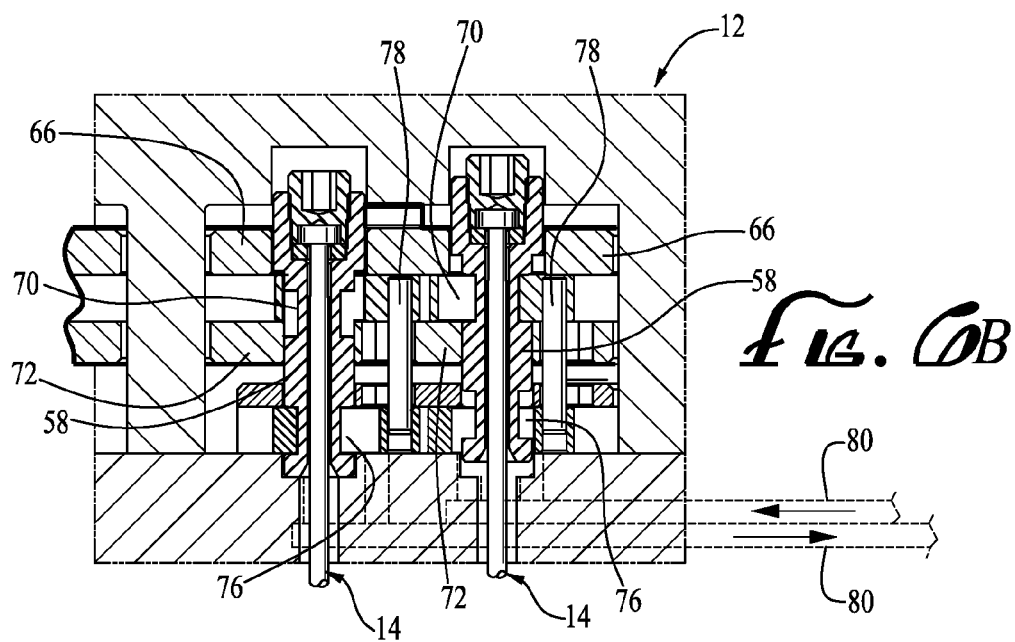
FIG. 6B is a second cross-sectional view of a portion of the locking apparatus illustrated in FIG. 5A, showing one of the valve stems in reciprocating mode and the other in non-reciprocating mode.

FIGS. 6A and 6B illustrate the first and second locking assemblies 20 and 22 for the same two injection tubes 38 illustrated in FIGS. 5A and 5B. However in FIGS. 6A and 6B, the first locking assembly 20 for the injection tube 38 on the left of the figure has been placed in the non-engaged position and the second locking assembly 22 has been placed into the engaged position. Thus, the valve stem 14 in the injection tube 38 on the left side of the figure remains stationary when the common plate 18 reciprocates. It remains stationary when the valve stem 14 on the injection tube to the right of the figure reciprocates downwardly (FIG. 6A) and upwardly (FIG. 6B).

Figure 7:
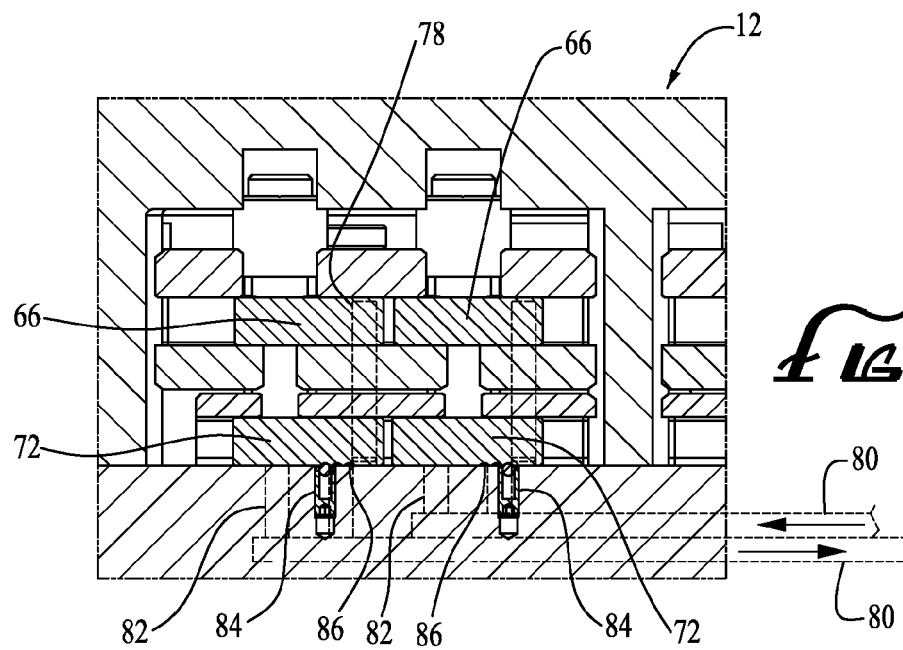
FIG. 7 is a cross-sectional detailed view of the locking mechanism illustrated in FIG. 3.

FIG. 7 is a similar cross-sectioned to those of FIGS. 5A, 5B, 6A and 6B. FIG. 7 illustrates the use of detents 84 to engage the two sliding levers 80 to their respective stationary unit slide locks 72. Each detent 84 is nested within a detent notch 86 disposed on the underside of the one of the stationary unit slide locks 72. As illustrated in FIG. 7, three detent notches 86 can be provided on the underside of both stationary unit slide locks 72, one for the engaged position, one for the non-engaged position and one (in the center) for a "neutral" position. In the neutral position, the valve stem 14 is attached to neither the common plate 18 nor the stationary unit 16.

Figure 9:
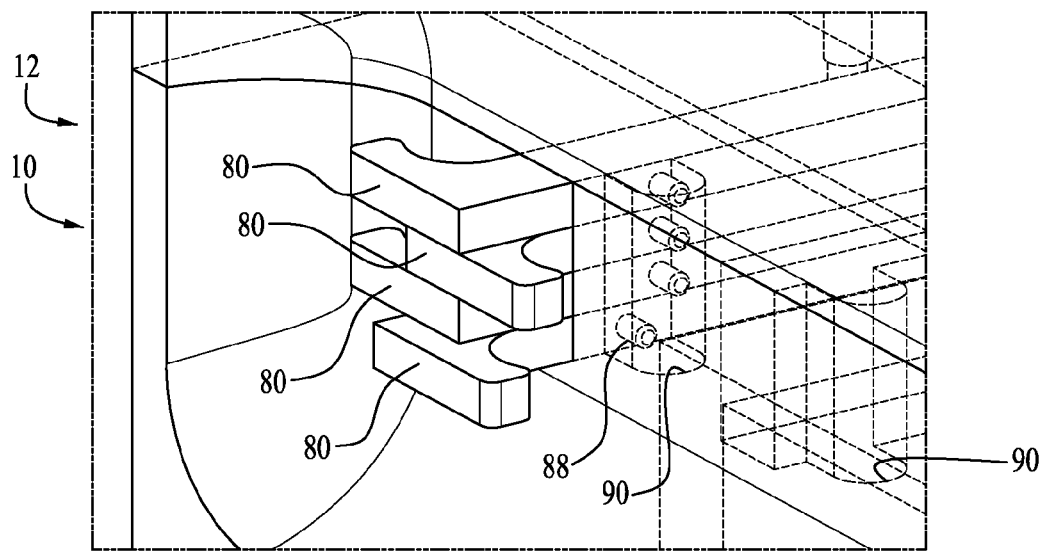
FIG. 9 is a perspective cut-away detailed view of a portion of the locking mechanism illustrated in FIG. 8.

FIGS. 8 and 9 illustrate how each sliding lever 80 can be retained in proper position by the interaction of a sliding lever prong 88 attached to each sliding lever 80, engaged within one or more prong grooves 90 defined in the mold.

The invention provides an actuation apparatus for a common plate hot runner system which allows the operator to easily and conveniently shut down one of the injection tubes without affecting the operation of the remaining injection tubes. Moreover, the linking of the first locking assembly to the second locking assembly precludes any chance of the operator doing damage to the machine by inadvertently locking one of the valve stems without releasing that valve stem from the common plate.

Having thus described the invention, it should be apparent that numerous structural modifications and adaptations may be resorted to without departing from the scope and fair meaning of the instant invention as set forth hereinabove and as described herein below by the claims.

What is claimed:

1. A locking apparatus useful in a machine having multiple stems which axially reciprocate with respect to a stationary unit, the stems being caused to axially reciprocate in unison by linkage with a reciprocating common plate, the locking apparatus comprising:
(a) a first locking assembly capable of alternatively assuming (i) a first locking assembly engaged position wherein at least one of the reciprocating stems is affixed to the common plate, and (ii) a first locking assembly non-engaged position wherein the at least one reciprocating stem is not affixed to the common plate; and
(b) a second locking assembly is capable of alternatively assuming (i) a second locking assembly engaged position wherein the at least one reciprocating stem is affixed to the stationary unit, and (ii) a second locking assembly non-engaged position wherein the at least one reciprocating stem is not affixed to the stationary unit;
wherein the first locking assembly, the second locking assembly and the at least one reciprocating stem are configured so that, when the first locking assembly is placed in the first locking assembly engaged position, the second locking assembly is automatically placed in the second locking assembly non-engaged position and, when the first locking assembly is placed in the first locking assembly non-engaged position, the second locking assembly is automatically placed in the second locking assembly engaged position.

2. The locking apparatus of claim 1 wherein the first locking assembly is provided by a common plate slide lock and the second locking assembly is provided by a stationary unit slide lock.

3. The locking assembly of claim 2 wherein each stem is surrounded by a stem housing, and wherein the common plate slide lock and the stationary unit slide lock both define an elongate central opening large enough to allow the stem housing to freely pass through the center of both central openings.

4. The locking assembly of claim 3 wherein the exterior of each stem housing defines a first pair of opposed notches and a second pair of opposed notches, the first pair of opposed notches being capable of accepting and retaining the common plate slide lock when the common plate slide lock is disposed in abutment with the stem housing, and the second pair of opposed notches being capable of accepting and retaining the stationary unit slide lock when the stationary unit slide lock is disposed in abutment with the stem housing.

5. The locking assembly of claim 1 wherein the first locking assembly is mechanically linked to the second locking assembly.

6. The locking apparatus of claim 5 wherein the first locking assembly is mechanically linked to the second locking assembly by one or more dowels.

7. The locking assembly of claim 1 wherein the position of the first locking assembly and the second locking assembly is adjusted by a single sliding lever.

8. The locking assembly of claim 1 wherein both the first and second locking assemblies can be placed into a neutral position wherein the stem is not affixed to either the common plate or the stationary unit.

9. The locking assembly of claim 1 wherein the stems are valve stems in a hot runner actuation system.

10. A mold having a hot runner actuation system with multiple valve stems which axially reciprocate with respect to a stationary unit, the valve stems being caused to axially reciprocate in unison by linkage with a reciprocating common plate, the mold further comprising a plurality of locking apparatuses, each controlling one of the valve stems, each locking apparatus comprising:
 (a) a first locking assembly capable of alternatively assuming (i) a first locking assembly engaged position wherein at least one of the reciprocating valve stems is affixed to the common plate, and (ii) a first locking assembly non-engaged position wherein the at least one reciprocating valve stem is not affixed to the common plate; and
 (b) a second locking assembly is capable of alternatively assuming (i) a second locking assembly engaged position wherein the at least one reciprocating valve stem is affixed to the stationary unit, and (ii) a second locking assembly non-engaged position wherein the at least one reciprocating valve stem is not affixed to the stationary unit;
 wherein the first locking assembly, the second locking assembly and the at least one valve stem are configured so that, when the first locking assembly is placed in the first locking assembly engaged position, the second locking assembly is automatically placed in the second locking assembly non-engaged position and, when the first locking assembly is placed in the first locking assembly non-engaged position, the second locking assembly is automatically placed in the second locking assembly engaged position.

11. The mold of claim 10 wherein the first locking assembly is provided by a common plate slide lock and the second locking assembly is provided by a stationary unit slide lock.

12. The mold of claim 11 wherein each valve stem is surrounded by a valve stem housing, and wherein the common plate slide lock and the stationary unit slide lock both define an elongate central opening large enough to allow the valve stem housing to freely pass through the center of both central openings.

13. The mold of claim 12 wherein the exterior of each valve stem housing defines a first pair of opposed notches and a second pair of opposed notches, the first pair of opposed notches being capable of accepting and retaining the common plate slide lock when the common plate slide lock is disposed in abutment with the valve stem housing, and the second pair of opposed notches being capable of accepting and retaining the stationary unit slide lock when the stationary unit slide lock is disposed in abutment with the valve stem housing.

14. The mold of claim 10 wherein the first locking assembly is mechanically linked to the second locking assembly.

15. The mold of claim 14 wherein the first locking assembly is mechanically linked to the second locking assembly by one or more dowels.

16. The mold of claim 10 wherein the position of the first locking assembly and the second locking assembly is adjusted by a single sliding lever.

17. The mold of claim 10 wherein both the first and second locking assemblies can be placed into a neutral position wherein the valve stem is not affixed to either the common plate or the stationary unit.

* * * * *